(12) United States Patent
Yuan et al.

(10) Patent No.: US 10,338,709 B2
(45) Date of Patent: Jul. 2, 2019

(54) TOUCH DISPLAY DEVICE WITH INCONSPICUOUS TRANSPARENT ELECTRODES AND ELECTRONIC APPARATUS

(71) Applicants: Shanghai Tianma Micro-Electronics Co., Ltd., Shanghai (CN); Tianma Micro-Electronics Co., Ltd., Shenzhen (CN)

(72) Inventors: Yong Yuan, Shanghai (CN); Yungang Sun, Shanghai (CN); Chunmei He, Shanghai (CN); Xianxiang Zhang, Shanghai (CN)

(73) Assignees: Shanghai Tianma Micro-Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 257 days.

(21) Appl. No.: 14/720,658

(22) Filed: May 22, 2015

(65) Prior Publication Data
US 2016/0147344 A1  May 26, 2016

(30) Foreign Application Priority Data
Nov. 25, 2014  (CN) .......................... 2014 1 0691087

(51) Int. Cl.
*G06F 3/041* (2006.01)
*G06F 3/044* (2006.01)
(52) U.S. Cl.
CPC ............ *G06F 3/0412* (2013.01); *G06F 3/044* (2013.01)

(58) Field of Classification Search
CPC .............................. G06F 3/0412; G06F 3/044
See application file for complete search history.

(56) References Cited

U.S. PATENT DOCUMENTS

2009/0206954 A1* 8/2009 Hashimoto ........ H03H 9/02992
333/195
2012/0268418 A1* 10/2012 Ishizaki ................ G06F 3/0412
345/174
(Continued)

FOREIGN PATENT DOCUMENTS

CN     103080876 A    5/2013
CN     103345340 A    10/2013
(Continued)

*Primary Examiner* — William Boddie
*Assistant Examiner* — Andrew B Schnirel
(74) *Attorney, Agent, or Firm* — Anova Law Group, PLLC

(57) ABSTRACT

The present invention discloses a touch display device and an electronic apparatus. The touch display device includes a display unit and a touch unit. The touch unit include a transparent electrode, and a pattern of the transparent electrode includes a plurality of first touch electrodes and a plurality of dummy electrodes; and each of the dummy electrodes includes at least two columns of dummy sub-electrodes, each of the columns of dummy sub-electrodes includes a plurality of dummy sub-electrodes arranged in the first direction with each of the dummy sub-electrodes extending in the first direction, there is a sub-slit formed between every two adjacent dummy sub-electrodes in each of the columns of dummy sub-electrodes, and at least a part of the sub-slits of at least two adjacent ones of the columns of dummy sub-electrodes are arranged staggeredly in the first direction. The electronic apparatus includes the touch display device.

20 Claims, 14 Drawing Sheets

(56) References Cited

U.S. PATENT DOCUMENTS

| | | | | |
|---|---|---|---|---|
| 2014/0015624 A1* | 1/2014 | Kishino | ............... | H03H 9/1085 |
| | | | | 333/187 |
| 2014/0055412 A1 | 2/2014 | Teramoto | | |
| 2014/0292713 A1* | 10/2014 | Koito | .................... | G06F 3/0412 |
| | | | | 345/174 |
| 2014/0293159 A1* | 10/2014 | Adachi | ................ | G06F 3/0412 |
| | | | | 349/12 |
| 2014/0320760 A1 | 10/2014 | Ishizaki et al. | | |
| 2016/0085351 A1* | 3/2016 | Adachi | ................... | G06F 3/041 |
| | | | | 345/174 |
| 2016/0111328 A1* | 4/2016 | Mei | ........................ | G06F 3/044 |
| | | | | 156/345.3 |

FOREIGN PATENT DOCUMENTS

| CN | 103403656 A | 11/2013 |
|---|---|---|
| CN | 104076975 A | 10/2014 |
| CN | 104076998 A | 10/2014 |

\* cited by examiner

TOUCH DISPLAY DEVICE WITH INCONSPICUOUS TRANSPARENT ELECTRODES AND ELECTRONIC APPARATUS

CROSS-REFERENCES TO RELATED APPLICATIONS

This application claims the benefit of priority to Chinese Patent Application No. 201410691087.1, filed with the Chinese Patent Office on Nov. 25, 2014 and entitled "TOUCH DISPLAY DEVICE AND ELECTRONIC APPARATUS" the content of which is incorporated herein by reference in its entirety.

TECHNICAL FIELD

The present invention relates to the field of touch display technologies, and particularly to a touch display device and an electronic apparatus including the touch display device.

BACKGROUND OF THE INVENTION

A display device with a touch function (i.e., a touch display device) has been widely used in recent years, and particularly a touch display device in which transparent electrodes (which can be one or both of touch drive electrodes and touch detection electrodes) for touch detection are arranged on the side of a display panel facing human eyes has become a significant research issue. Since a transparent electrode is not completely transparent, how to lower conspicuousness of a pattern of the transparent electrode, i.e., to achieve inconspicuousness thereof, while guaranteeing the display image quality has been a technical problem that needs to be addressed.

BRIEF SUMMARY OF THE INVENTION

The present invention provides solutions to solve the technical problem in the prior art of quality degradation of display due to the presence of a conspicuous pattern of a transparent electrode in a touch display device.

Embodiments of the present invention provide a touch display device that may solve the prior art problems.

According to an embodiment, a touch display device includes a display unit and a touch unit, wherein the touch unit includes a transparent electrode arranged opposite to the display unit, and a pattern of the transparent electrode includes a plurality of first touch electrodes and a plurality of dummy electrodes; and each of the first touch electrodes extends in a first direction; and each of the dummy electrodes includes at least two columns of dummy sub-electrodes, each of the columns of dummy sub-electrodes includes a plurality of dummy sub-electrodes arranged in the first direction with each of the dummy sub-electrodes extending in the first direction, there is a sub-slit formed between every two adjacent dummy sub-electrodes in each of the columns of dummy sub-electrodes, and at least a part of the sub-slits of at least two adjacent ones of the columns of dummy sub-electrodes are arranged staggeredly in the first direction.

In another embodiment, a touch display device includes a display unit and a touch unit, wherein the touch unit include a transparent electrode arranged opposite to the display unit, and a pattern of the transparent electrode includes a plurality of first touch electrodes and a plurality of dummy electrodes; and each of the first touch electrodes extends in a first direction; and each of the dummy electrodes includes a plurality of columns of dummy sub-electrodes, each of the columns of dummy sub-electrodes includes a plurality of dummy sub-electrodes arranged in the first direction with each of the dummy sub-electrodes extending in the first direction, there is a sub-slit formed between every two adjacent dummy sub-electrodes in each of the columns of dummy sub-electrodes, the sub-slits in the same dummy electrode form a plurality of rows of sub-slits, which are spaced apart from one another in the first direction, and the sub-slits in each of the rows of sub-slits are connected into a shape other than a straight line.

Embodiments of the present invention also provide an electronic apparatus that includes the touch display device according to any one of the above-described embodiments.

In the touch display device and the electronic apparatus according to embodiments of the present invention, at least a part of the sub-slits of at least two adjacent ones of the columns of dummy sub-electrodes are arranged staggeredly in the first direction or the sub-slits in each of the rows of sub-slits are connected into a shape other than a straight line to thereby avoid the sub-slits from being connected into a long strip-shaped transverse slit in the second direction perpendicular to the first direction and hence lower conspicuousness of a pattern of the transparent electrode.

DETAILED DESCRIPTION OF THE PREFERRED EMBODIMENTS

Embodiments of the present invention will be described below clearly and fully with reference to the drawings in the embodiments of the present invention. Apparently, the embodiments are described herein by illustration and not by way of limitation. Features described with respect to different embodiments can be combined by those ordinarily skilled in the art without departing from the scope of the present invention.

A general goal of the present invention is to provide a touch display device and an electronic apparatus, where the touch display device includes a display unit and a touch unit. The touch unit includes a transparent electrode arranged opposite to the display unit, and a pattern of the transparent electrode includes a plurality of first touch electrodes and a plurality of dummy electrodes; the first touch electrodes are configured to transmit a touch signal, and the dummy electrodes are not configured to transmit a touch signal. Each of the first touch electrodes extends in a first direction; and each of the dummy electrodes includes at least two columns of dummy sub-electrodes, each of the columns of dummy sub-electrodes includes a plurality of dummy sub-electrodes arranged in the first direction with each of the dummy sub-electrodes extending in the first direction. There is a sub-slit formed between every two adjacent dummy sub-electrodes in each of the columns of dummy sub-electrodes, at least a part of the sub-slits of at least two adjacent ones of the columns of dummy sub-electrodes are arranged staggeredly in the first direction, or the sub-slits in the same dummy electrode constitute a plurality of rows of sub-slits, which are spaced apart from one another in the first direction, and the sub-slits in each of the rows of sub-slits are connected into a shape other than a straight line, thus avoiding the sub-slits being connected in a second direction to form a long strip-shaped transverse slit, thereby lowering the conspicuousness of a pattern of the dummy electrode, and consequentially the pattern of the transparent electrode.

The touch display device according to the present invention includes a display unit and a touch unit, where the display unit is typically a display panel, such as a liquid crystal display panel, an organic light-emitting display panel, an electronic paper, etc. The touch unit can be a capacitive touch unit, an electromagnetic touch unit, a resistive touch unit, etc. A structure and an operating mode of the touch display device according to the present invention will be described below taking a touch display device including a capacitive touch unit and a liquid crystal display panel as an example.

Figure 1:
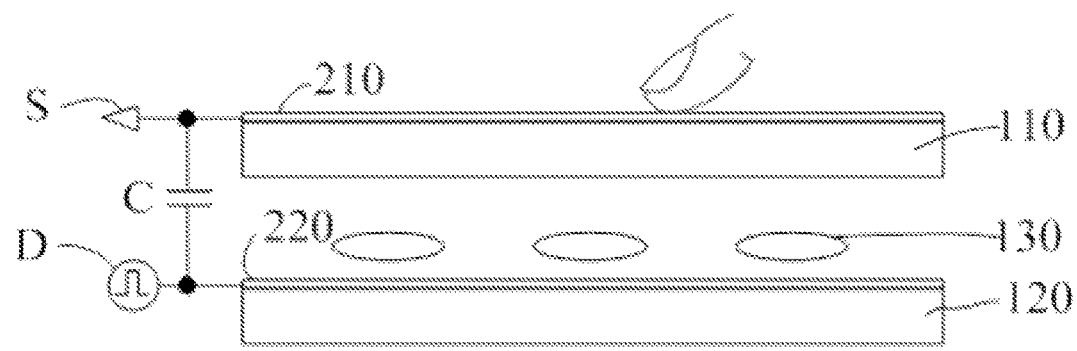
FIG. 1 illustrates a simplified cross-sectional view of a touch display device according to an embodiment of the present invention.

FIG. 1 illustrates a simplified cross-sectional view of a touch display device according to an embodiment of the present invention. By way of example, a display unit in FIG. 1 is a liquid crystal display panel including a first substrate 110, and a second substrate 120, arranged opposite to each other, and a liquid crystal layer 130 arranged between the first substrate 110 and the second substrate 120. By way of example, the touch unit is a bi-layered mutual-capacitive touch unit including first touch electrodes 210 and second touch electrodes 220. The second touch electrodes, which can be arranged on the inside of the second substrate 120 (i.e., the side of the second substrate 120 proximate to the liquid crystal layer 130), are typically touch drive electrodes to which a touch drive signal D is applied. The first touch electrodes 210 arranged on the outside of the first substrate 110 (i.e., the side of the first substrate 110 facing away from the liquid crystal layer 130) are typically touch sense electrodes from which a touch detection circuit (not illustrated) detects a touch sense signal S. An operating principle of driving and detecting a mutual-capacitive touch unit is well-known in the prior art, which will be briefly described herein: there is a capacitor C formed between the first touch electrode 210 and the second touch electrode 220, and when a finger approaches or touches the touch unit, an additional capacitor (not illustrated) is generated to equivalently change the capacitor C into a capacitor C'. With a touch occurring, there are the touch drive signal D, and a touch sense signal S' different from the touch sense signal S without any touch occurring, and it can be further determined whether there is a touch occurring at certain location.

It shall be noted that the display unit will not be limited to a liquid crystal display panel and the touch unit will not be limited to mutual-capacitive touch unit. In another embodiment, the second touch electrodes 220 in FIG. 1 can alternatively be arranged on the inside of the first substrate 110 (i.e., the side of the first substrate 110 proximate to the liquid crystal layer 130).

Figure 2:
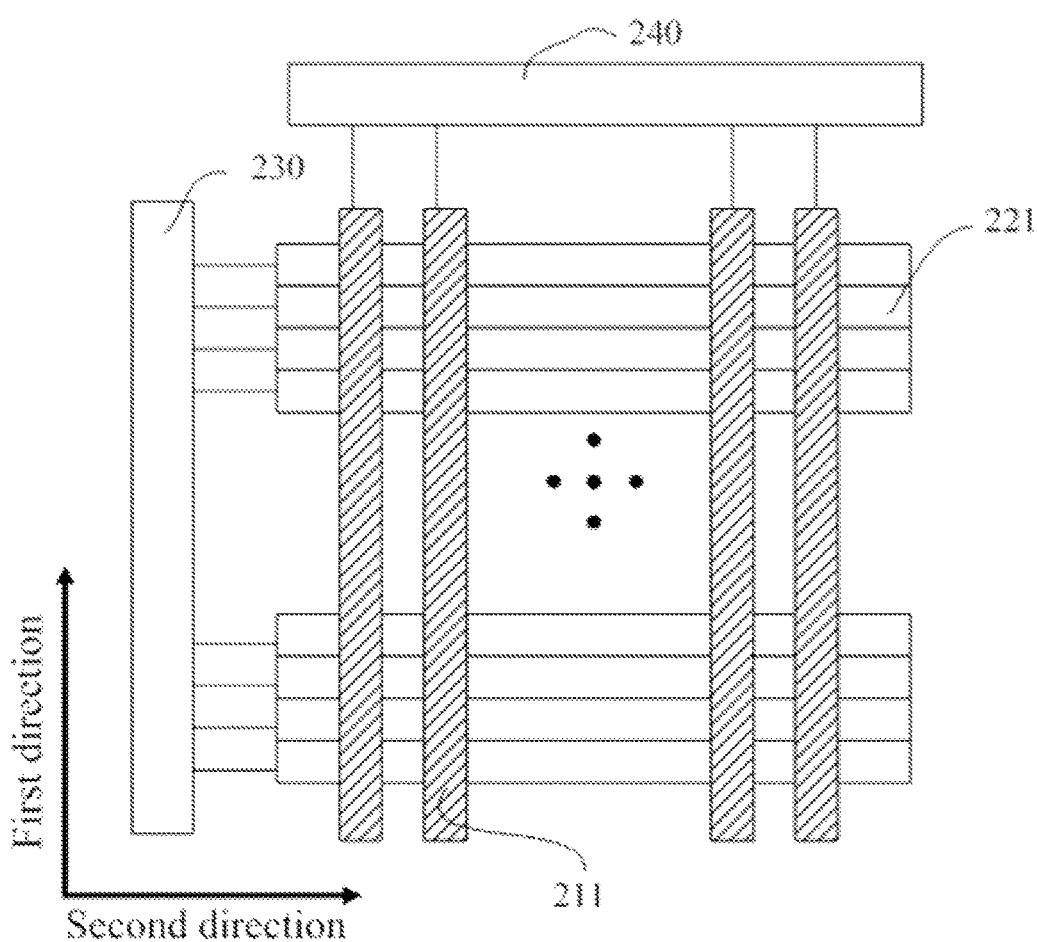
FIG. 2 illustrates a schematic structural diagram of a mutual-capacitive touch unit according to an embodiment of the present invention.

FIG. 2 illustrates a schematic structural diagram of a mutual-capacitive touch unit according to an embodiment of the present invention. The mutual-capacitive touch unit include a first touch electrode, and a second touch electrode, arranged in opposition, where the first touch electrode includes a plurality of first sub-touch electrodes 211 extending in a first direction and arranged in parallel in a second direction, and the second touch electrode includes a plurality of second sub-touch electrodes 221 extending in the second direction and arranged in parallel in the first direction. The mutual-capacitive touch unit further includes a touch drive circuit 230 providing a touch drive signal to the second touch electrode, and a touch detection circuit 240 detecting a touch sense signal from the first touch electrode. Typically, the first direction is perpendicular or substantially perpendicular to the second direction. It shall be noted that the term "extend" in this context refers to the size of the electrode in the extension direction being larger than the size thereof in the direction perpendicular to the extension direction.

Figure 3:
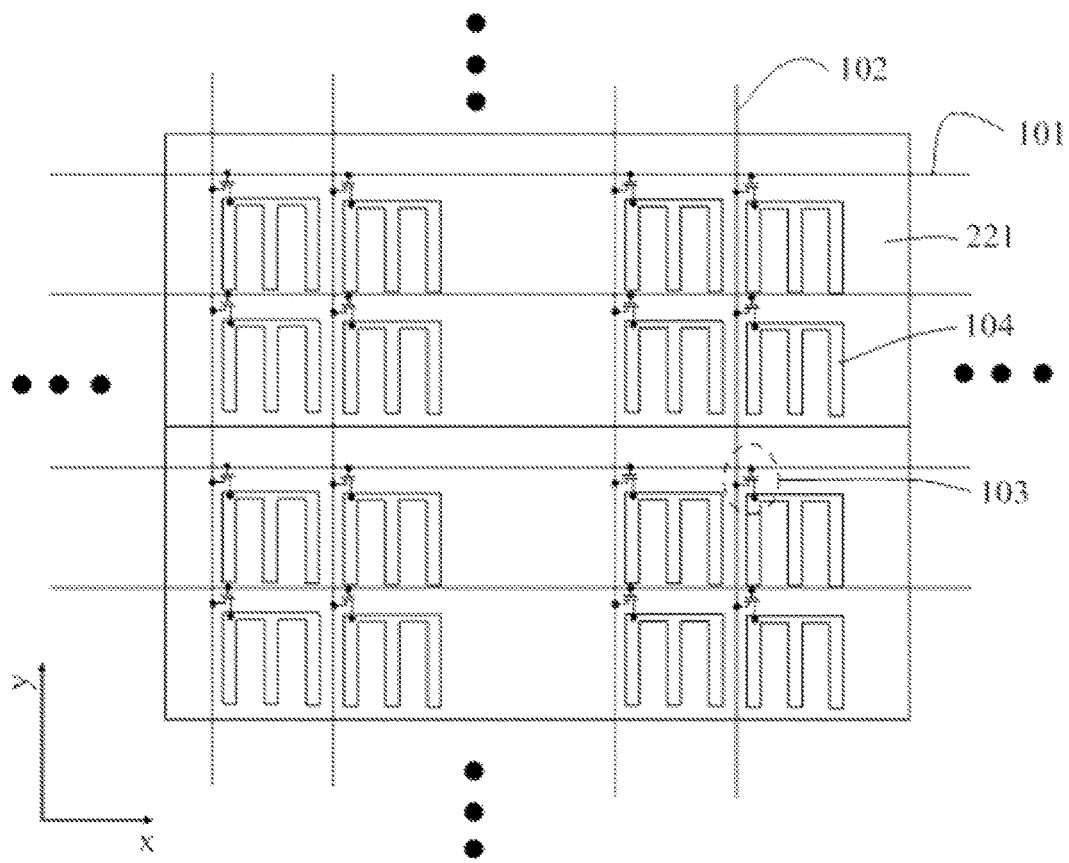
FIG. 3 illustrates a schematic diagram of a pixel array in which a common electrode is a touch drive electrode.

An existing structure in the liquid crystal display panel can also be reused as the second touch electrode 220 which is a touch drive electrode in FIG. 1. For example, the liquid crystal display panel typically further includes a pixel array arranged between the first substrate 110 and the second substrate 120 (on the inside of the second substrate 120 as illustrated), and an existing structure in the pixel array can be reused as the second touch electrode 220. FIG. 3 illustrates a schematic diagram of a pixel array in which a common electrode is also reused as a touch control drive electrode. As can be apparent from FIG. 3, the pixel array includes a plurality of scan lines 101 extending in the second direction (the X direction) and arranged in parallel in the first direction (the Y direction), a plurality of data lines 102 extending in the Y direction and arranged in parallel in the X direction, and pixel cells arranged in pixel areas surrounded by every two adjacent ones of the gate lines and every two adjacent ones of the data lines. Each of the pixel cells includes a pixel switch 103, a pixel electrode 104, and a common electrode arranged opposite to the pixel electrode 104. The pixel switch 103 is typically a Thin Film Transistor (TFT) with a gate electrically connected with the scan line 101, a source electrically connected with the data line 102, and a drain electrically connected with the pixel electrode 104. A plurality of the pixel electrodes 104 are arranged in a array including a plurality of rows and a plurality of columns so that each of the rows of pixel electrode 104 is parallel to the X direction and each of the columns of pixel electrode 104 is parallel to the Y direction. The common electrode includes a plurality of second sub-touch electrodes 221, and each of the second sub-touch electrodes 221 extents in the X direction and is arranged in parallel in the Y direction. Typically, a second sub-touch electrode 221 cover a row of pixel cells in the X direction and may cover an integer or a non-integer number of rows of pixel cells in the Y direction. FIG. 3 illustrates one second sub-touch electrode 221 covering two rows of pixel cells in the Y direction.

Furthermore, the touch unit includes not only the first touch electrodes 210, but also dummy electrodes, located at the same layer and made of a transparent electrically-conductive material as the first touch electrodes 210; in other words, the touch unit includes a transparent electrode arranged opposite to the display unit. The transparent electrode includes the first touch electrodes 210 configured to transmit a touch signal (including a touch drive signal and/or a touch sense signal), and the dummy electrodes not configured to transmit a touch signal, which are not electrically connected with the first touch electrodes 210. Since the transparent electrode is not transparent completely, the dummy electrodes can be arranged to thereby improve the transmissivity of the transparent electrode while suppressing conspicuousness of the pattern of the transparent electrode. Several preferred patterns of the transparent electrode will be set forth below with reference to the drawings.

Figure 4:
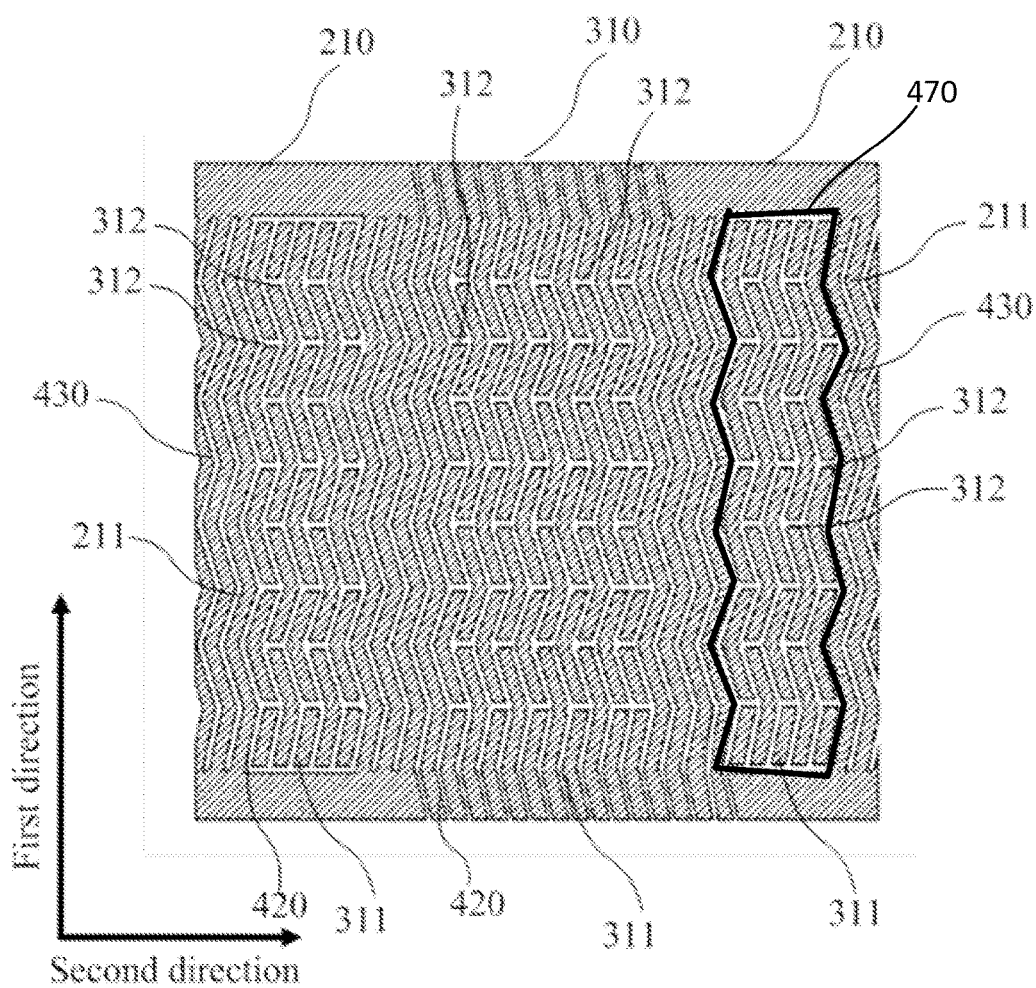
FIG. 4 illustrates a schematic diagram of a pattern of a transparent electrode according to an embodiment of the present invention.

FIG. 4 illustrates a schematic diagram of a pattern of a transparent electrode according to an embodiment of the present invention. As can be apparent from the FIG. 4, the pattern of the transparent electrode includes a plurality of first touch electrode 210 and a plurality of dummy electrodes 310. Each of the first touch electrodes 210 extends in the first direction, and the plurality of first touch electrode 210 are spaced apart from one another in the second direction, where the second direction is perpendicular to the first direction. Each of the first touch electrodes 210 includes a plurality of first sub-touch electrodes 211 extending in the first direction, and there is a third slit 430 formed between every two adjacent ones of the first sub-touch electrodes 211, which extends in the first direction as a folded line.

One of the dummy electrodes 310 is arranged between every two adjacent ones of the first touch electrodes 210, and each of the first touch electrodes 210 is provided with an opening 470 in which one of the dummy electrodes 310 is arranged. It shall be noted that the dummy electrodes 310 can alternatively be arranged only between every two adjacent ones of the first touch electrodes 210 or only in the opening 470 of the first touch electrodes 210.

The dummy electrodes are structured as illustrated in FIG. 4 where each of the dummy electrodes 310 includes a plurality of columns of dummy sub-electrodes, and there is a second slit 420 formed as a folded line formed between every two adjacent ones of the columns of dummy sub-electrodes. Each of the columns of dummy sub-electrodes includes a plurality of dummy sub-electrodes 311 arranged in the first direction, and each of the dummy sub-electrodes 311 extends in the first direction; and there is a straight sub-slit 312, at an angle of 0 degree in relation to the second direction (i.e., parallel to the second direction), formed between every two adjacent ones of the dummy sub-electrodes 311 in each of the columns of dummy sub-electrodes; and the straight sub-slits 312, at the angle of 0 degree in relation to the second direction, in every two adjacent ones of the columns of dummy sub-electrodes in the same dummy electrode 310 are arranged staggeredly in the first direction, where the dummy sub-electrodes 311 are v-shaped.

In the prior art, the sub-slits in all the columns of dummy sub-electrodes in the same dummy electrode are straight sub-slits, at an angle of 0 degree to the second direction, which are connected in the second direction into a long strip-shaped transverse slit. As can be apparent from the description above, with the dummy electrodes according to the embodiment of the present invention structured as illustrated in FIG. 4, the straight sub-slits 312, at the angle of 0 degree to the second direction, in every two adjacent ones of the columns of dummy sub-electrodes are arranged staggeredly in the first direction, that is, the sub-slits 312 in every two adjacent ones of the columns of dummy sub-electrodes are arranged staggeredly in the first direction, thus avoiding the sub-slits 312 being connected in the second direction to form a long strip-shaped transverse slit, thereby lowering the conspicuousness of, the pattern of the dummy electrode, and consequentially the pattern of the transparent electrode.

It shall be noted that conspicuousness of the pattern of the dummy electrode may be lowered as long as the sub-slits in every two adjacent ones of the columns of dummy sub-electrodes are arranged staggeredly in the first direction. The shapes of the third slit 430 and the second slit 420 in the pattern of the transparent electrode will not be limited to a folded line but can be a waved line or a straight line or the third slit 430 and the second slit 420 can be differently shaped slits.

Figure 5A:
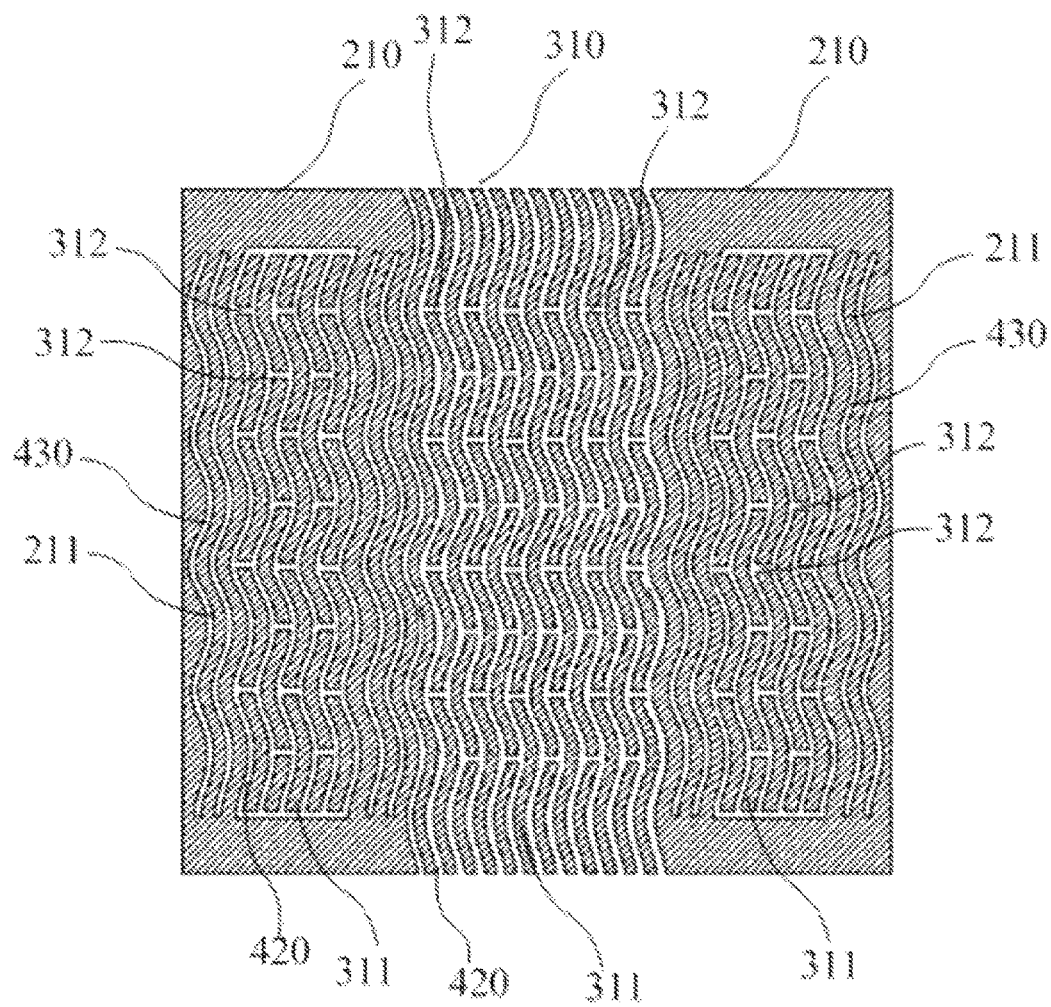
FIG. 5A illustrates a schematic diagram of a pattern of a transparent electrode according to an embodiment of the present invention.

FIG. 5A illustrates a schematic diagram of a pattern of a transparent electrode according to an embodiment of the present invention. As can be apparent from FIG. 5A, the third slit 430 and the second slit 420 are waved lines, and the dummy sub-electrode 311 is wave-shaped.

Figure 5B:
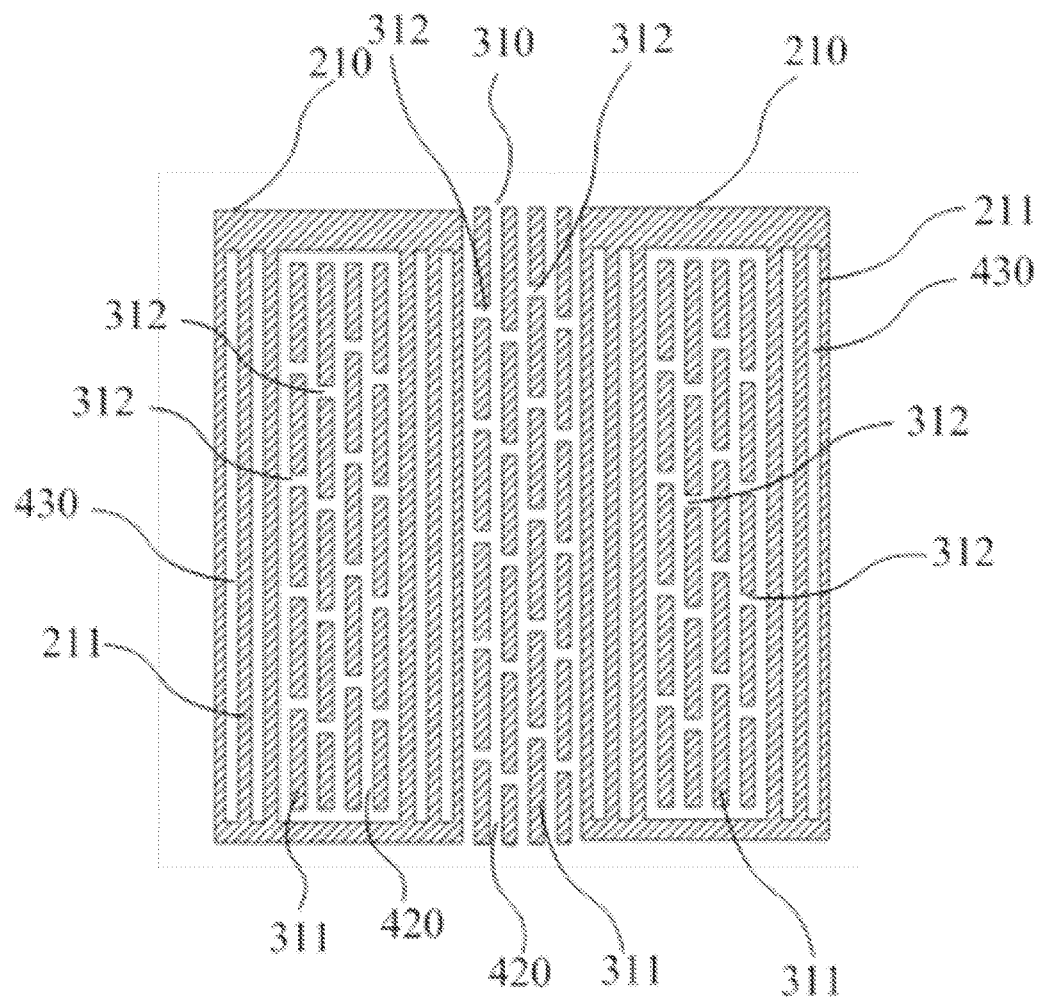
FIG. 5B illustrates a schematic diagram of a pattern of a transparent electrode according to an embodiment of the present invention.

FIG. 5B illustrates a schematic diagram of a pattern of a transparent electrode according to an embodiment of the present invention. As can be apparent from FIG. 5B, the third slit 430 and the second slit 420 are straight lines, and the dummy sub-electrode 311 is strip-shaped.

Figure 5C:
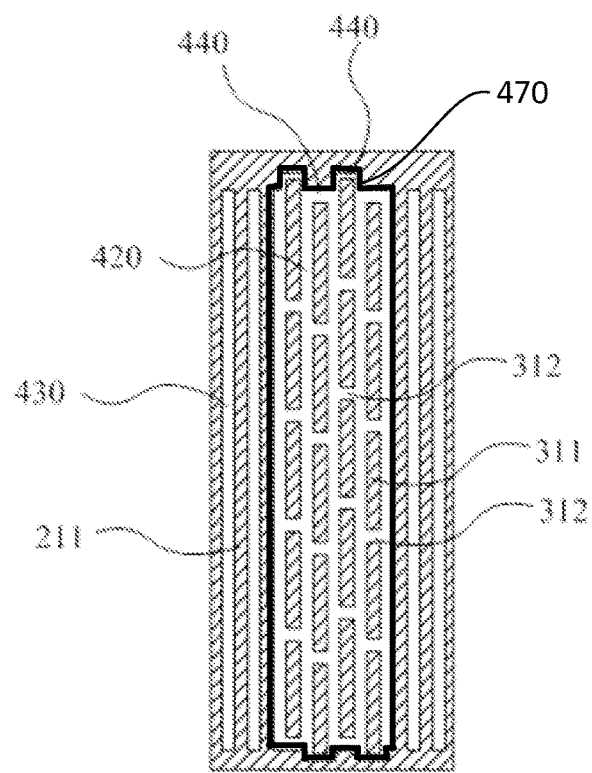
FIG. 5C illustrates a schematic diagram of a pattern of a first touch electrode and a dummy electrode in an opening thereof according to an embodiment of the present invention.

FIG. 5C illustrates a schematic diagram of a pattern of a first touch electrode and a dummy electrode in an opening 470 thereof according to an embodiment of the present invention. As can be apparent from FIG. 5C, fourth slits 440 are formed at the distal ends of each of the columns of dummy sub-electrodes of the dummy electrode and the edges of the opening of the first touch electrode, and every two adjacent ones of the fourth slits 440 are arranged staggeredly in the first direction. Thus, conspicuousness of the patterns of the first touch electrode and the dummy electrode arranged in the opening thereof can be further lowered.

Figure 5D:
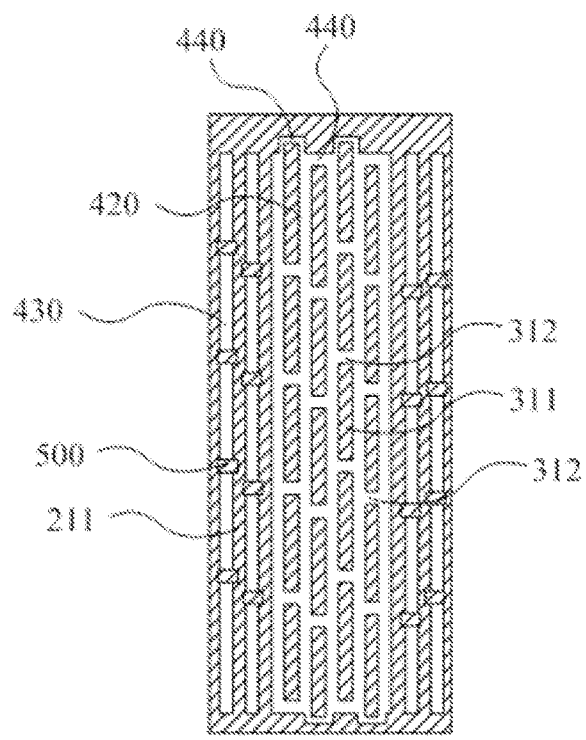
FIG. 5D illustrates a schematic diagram of a pattern of a first touch electrode and a dummy electrode in an opening thereof according to an embodiment of the present invention.

FIG. 5D illustrates a schematic diagram of a pattern of a first touch electrode and a dummy electrode in an opening 470 thereof according to an embodiment of the present invention. As can be apparent from FIG. 5D, the pattern of the transparent electrode illustrated in FIG. 5D differs from the pattern of the transparent electrode illustrated in FIG. 5C in that there are a plurality of first electrodes 500 arranged in each of the third slits 430 and the first electrodes 500 in adjacent ones of the third slits 430 are arranged staggeredly in the first direction. The third slits 430 are interrupted to be arranged staggeredly due to the first electrodes 500, thus lowering conspicuousness of the pattern of the first touch electrode.

Figure 5E:
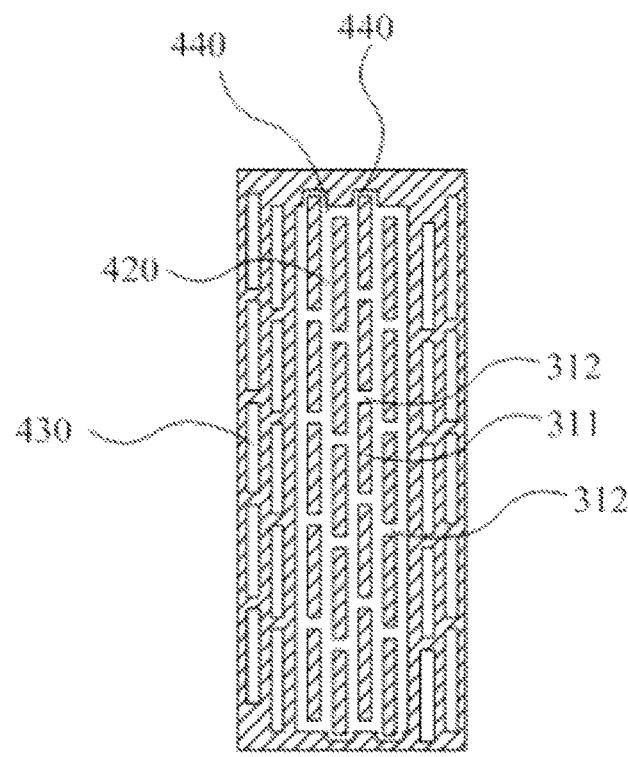
FIG. 5E illustrates a schematic diagram of a pattern of a first touch electrode and a dummy electrode in an opening thereof according to an embodiment of the present invention.

FIG. 5E illustrates a schematic diagram of a pattern of a first touch electrode and a dummy electrode in an opening 470 thereof according to an embodiment of the present invention. As can be apparent from FIG. 5E, the pattern of the transparent electrode illustrated in FIG. 5E differs from the pattern of the transparent electrode illustrated in FIG. 5C in that the third slits 430 consist of a plurality of columns of third slits with each of the columns of third slits including a plurality of third slits 430 arranged in the first direction and gaps between the third slits 430 in every two adjacent ones of the columns of third slits are arranged staggeredly in the first direction, thus lowering conspicuousness of the pattern of the first touch electrode.

Figure 6:
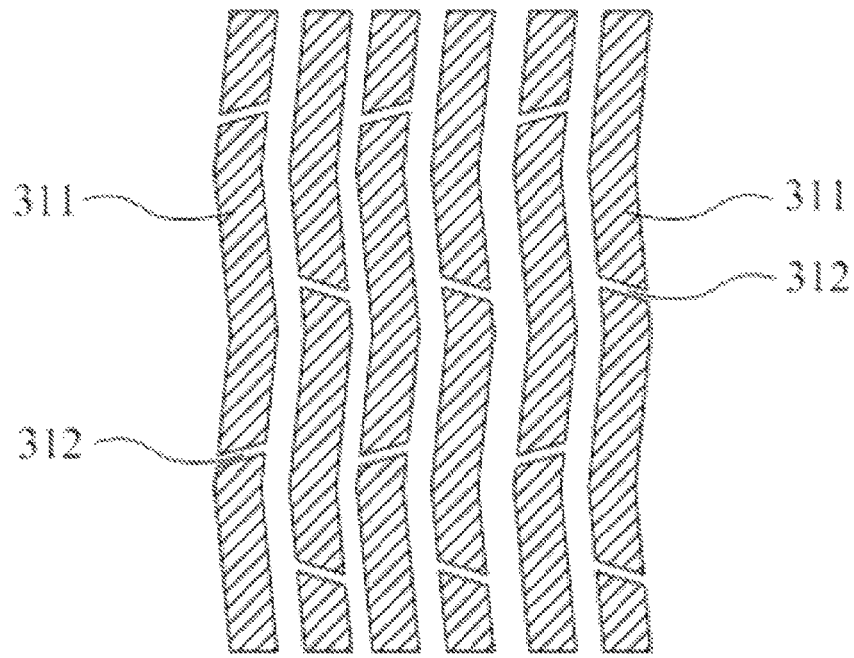
FIG. 6 illustrates a schematic diagram of a pattern of a dummy electrode according to an embodiment of the present invention.
Figure 7:
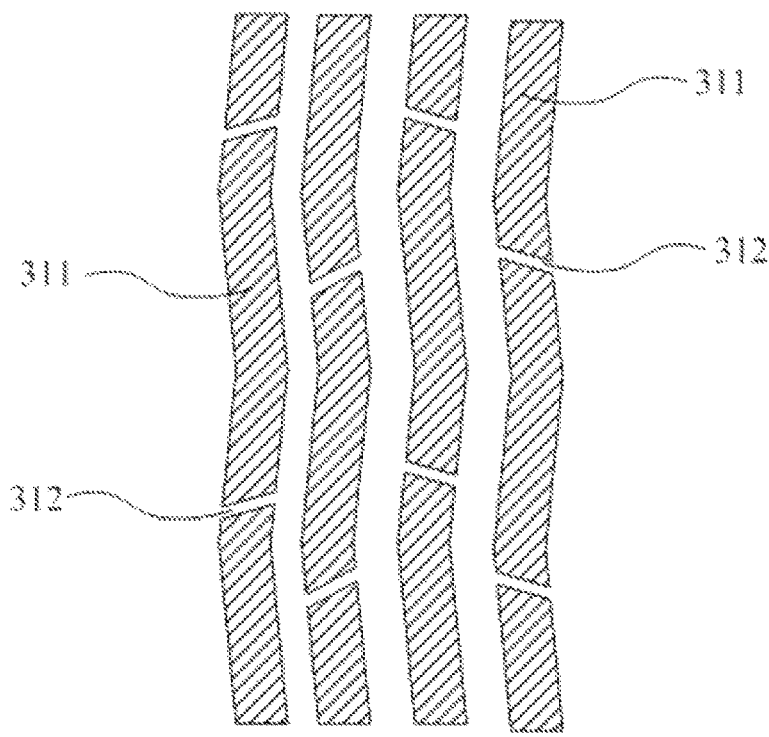
FIG. 7 illustrates a schematic diagram of a pattern of a dummy electrode according to an embodiment of the present invention.
Figure 8:
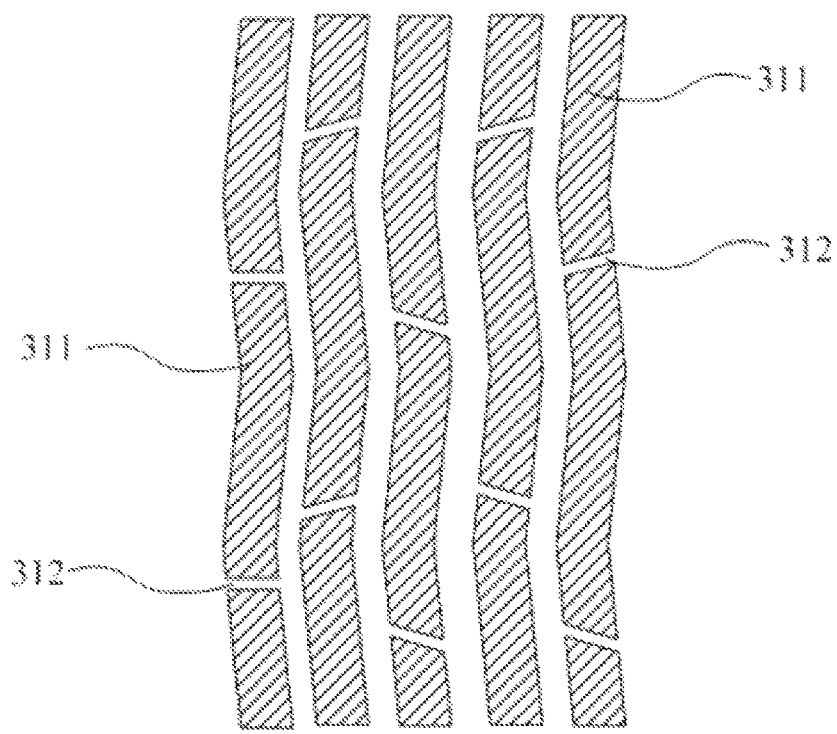
FIG. 8 illustrates a schematic diagram of a pattern of a dummy electrode according to an embodiment of the present invention.
Figure 9:
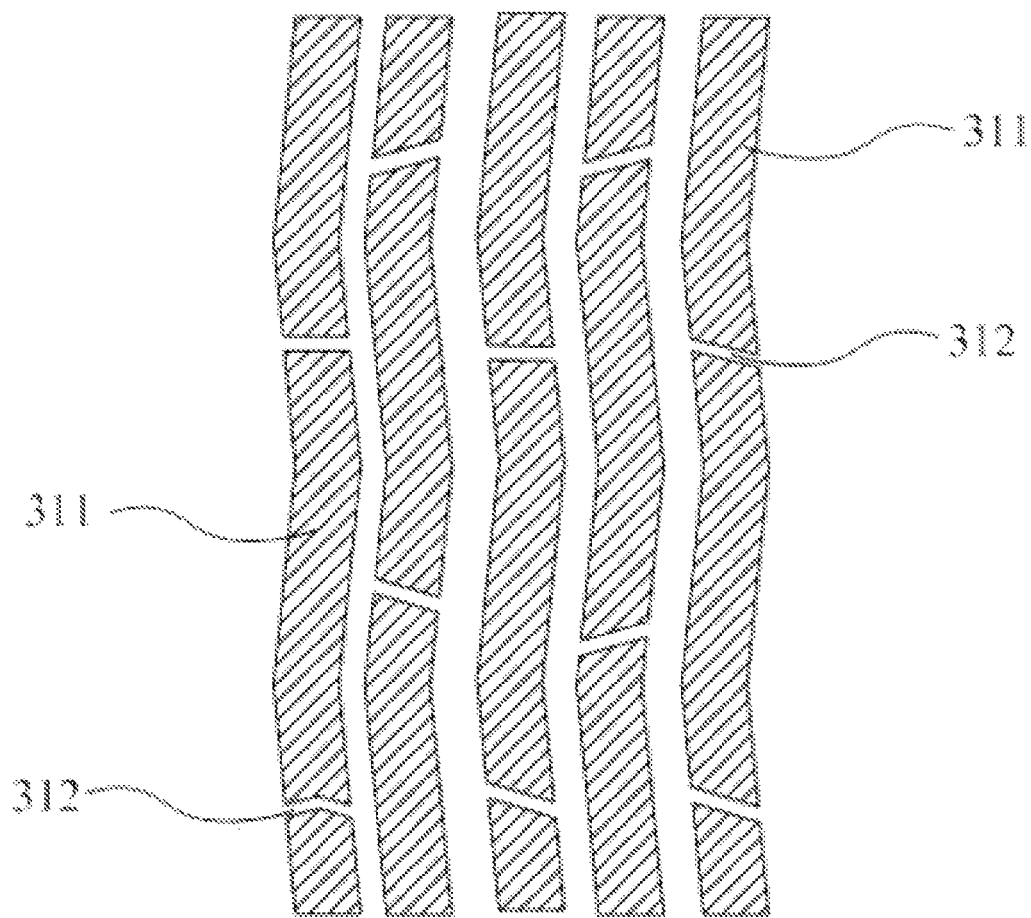
FIG. 9 illustrates a schematic diagram of a pattern of a dummy electrode according to an embodiment of the present invention.

It shall be noted that conspicuousness of the pattern of the dummy electrode can be lowered as long as the sub-slits of every two adjacent ones of the columns of dummy sub-electrodes are arranged staggeredly in the first direction, and conspicuousness throughout the pattern of the transparent electrode can be lowered in combination with the first touch electrode with lower conspicuousness of the pattern thereof. The sub-slits of every two adjacent ones of the columns of dummy sub-electrodes may be shaped identically or differently and may extend in the same direction or different directions, and the sub-slits of the same column of dummy sub-electrodes may be shaped identically or differently and may extend in the same direction or different directions. For example, the dummy electrode can be structured as illustrated in FIG. 6. As can be apparent from FIG. 6, the sub-slits 312 of the columns of dummy sub-electrodes are shaped identically as straight lines; and the sub-slits 312 of the odd-numbered columns of dummy sub-electrodes extend in the same direction, and the sub-slits 312 of the even-numbered columns of dummy sub-electrodes extend in the same direction, and the sub-slits 312 of the odd-numbered columns of dummy sub-electrodes extend in a different direction from the direction in which the sub-slits 312 of the even columns of dummy sub-electrodes extend. For example, the dummy electrode can be structured as illustrated in FIG. 7. As can be apparent from FIG. 7, the sub-slits 312 of the columns of dummy sub-electrodes are shaped identically as straight lines; and the sub-slits of the left columns of dummy sub-electrodes extend in the same direction, and the sub-slits of the right columns of dummy sub-electrodes extend in the same direction, and the sub-slits of the left columns of dummy sub-electrodes extend in a different direction from the direction in which the sub-slits of the right columns of dummy sub-electrodes extend. Likewise, the pattern of the dummy electrode can alternatively be as illustrated in FIG. 8 and FIG. 9, where a detailed description of more embodiments will be omitted herein.

All of the embodiments above relate to the scenario where the sub-slits of every two adjacent ones of the columns of dummy sub-electrodes in the same dummy electrode can be arranged staggeredly in the first direction to thereby lower conspicuousness of the pattern of the transparent electrode. However the embodiments of the present invention will not be limited thereto as long as the sub-slits of at least a part of the respective two adjacent ones of the columns of dummy sub-electrodes are arranged staggeredly in the first direction, for example, the transparent electrode can alternatively be a transparent electrode as illustrated in FIG. 10.

Figure 10:
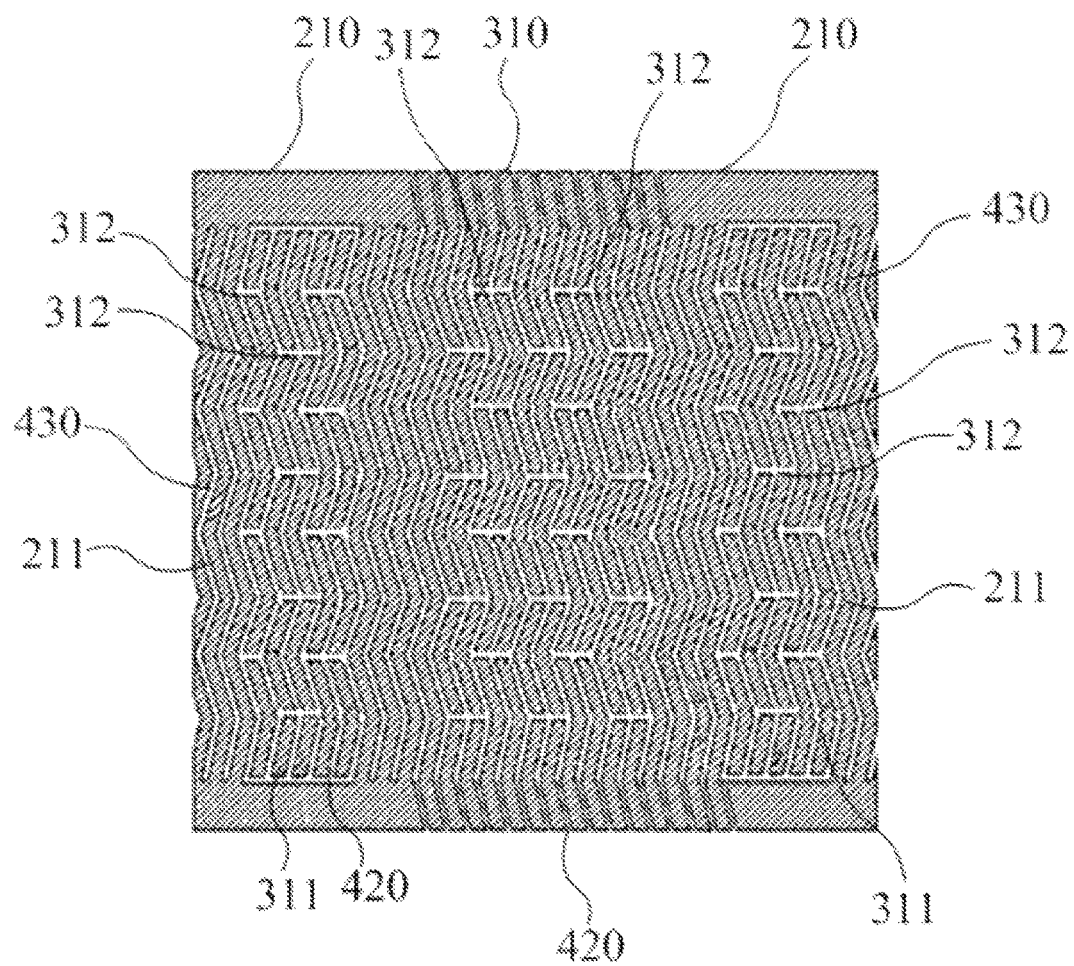
FIG. 10 illustrates a schematic diagram of a pattern of a transparent electrode according to an embodiment of the present invention.

FIG. 10 illustrates a schematic diagram of a pattern of a transparent electrode according to an embodiment of the present invention. As can be apparent from FIG. 10, a plurality of columns of dummy sub-electrodes of a dummy electrode 310 between two first touch electrodes 210 are divided into a plurality of groups, the columns of dummy sub-electrodes in the same group include two adjacent ones of the columns of dummy sub-electrodes, the sub-slits of the columns of dummy sub-electrodes in the same group form a plurality of rows of sub-slits, which are spaced apart from one another in the first direction, the sub-slits 312 in each of the rows of sub-slits are connected, and the sub-slits 312 are straight sub-slits at an angle of 0 degree to the second direction; and the sub-slits 312 of the adjacent columns of dummy sub-electrodes in every two adjacent ones of the groups are arranged staggeredly in the first direction.

The number of the columns of dummy sub-electrodes in the same group must be less than the number of the columns of dummy sub-electrodes in each of the dummy electrodes and will not be limited to 2 but can be 1 or 3, for example. Alternatively the numbers of the columns of dummy sub-electrodes in the different groups of columns of dummy sub-electrodes may not be the same, for example, there is one column of dummy sub-electrodes in one of the groups of columns of dummy sub-electrodes in the dummy electrode inside the opening of the first touch control electrode as illustrated in FIG. 10.

Figure 11:
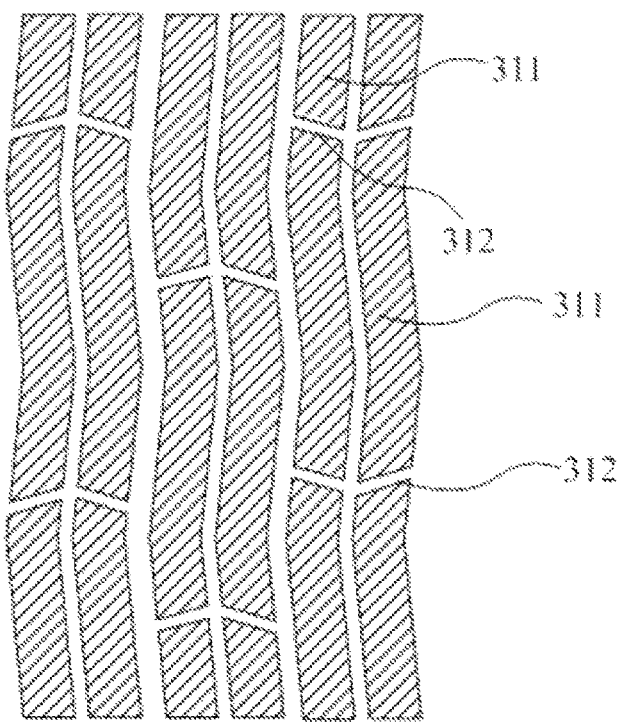
FIG. 11 illustrates a schematic diagram of a pattern of a dummy electrode according to an embodiment of the present invention.
Figure 12:
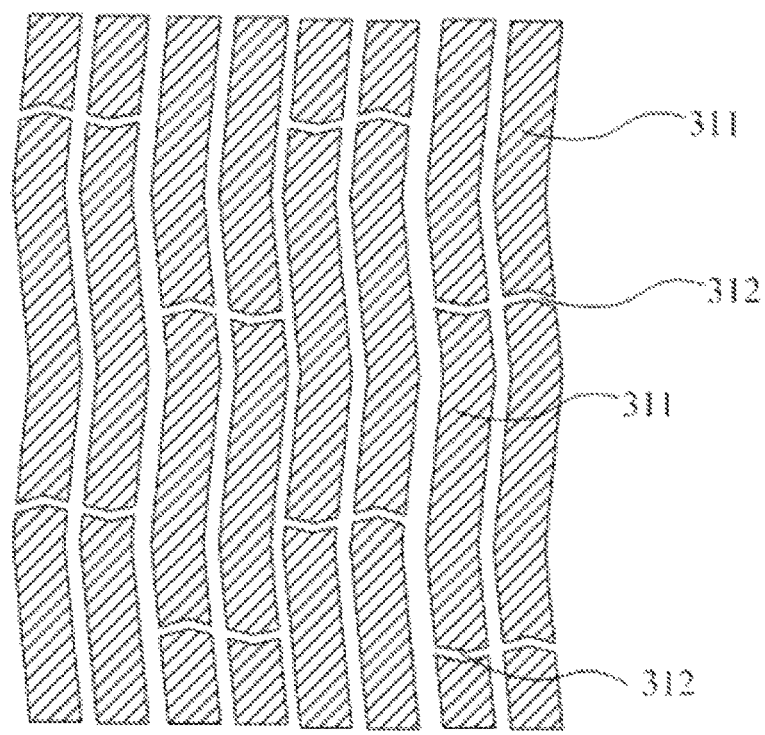
FIG. 12 illustrates a schematic diagram of a pattern of a dummy electrode according to an embodiment of the present invention.
Figure 13:
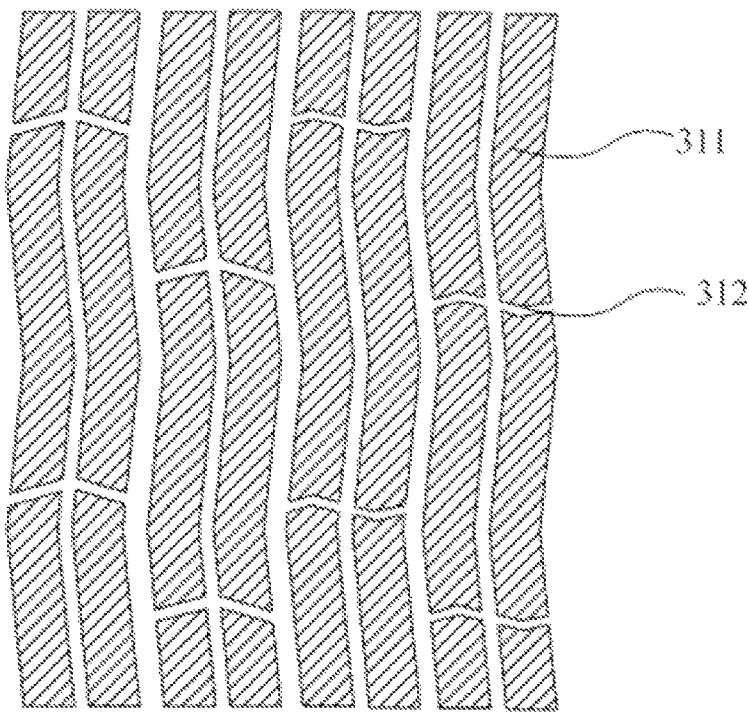
FIG. 13 illustrates a schematic diagram of a pattern of a dummy electrode according to an embodiment of the present invention.

It shall be noted that conspicuousness of the pattern of the dummy electrode can be lowered as long as the sub-slits of the adjacent columns of dummy sub-electrodes in every two adjacent ones of the groups are arranged staggeredly in the first direction. Thus the connected sub-slits of the columns of dummy sub-electrodes in the same group may be shaped identically or differently and may extend in the same direction or different directions, and the sub-slits in the same column of dummy sub-electrodes may be shaped identically or differently and may extend in the same direction or different directions. For example, the pattern of the dummy electrode can alternatively be as illustrated in FIG. 11 where the connected sub-slits 312 of the columns of dummy sub-electrodes in the same group are shaped identically as straight lines but extend in different directions. Similarly, the pattern of the dummy electrode can alternatively be as illustrated in FIG. 12 where the connected sub-slits 312 of the columns of dummy sub-electrodes in the same group are shaped differently as different folded lines and extend in different directions, or similarly the pattern of the dummy electrode can alternatively be as illustrated in FIG. 13, where a detailed description of more embodiments will be omitted here.

Figure 14:
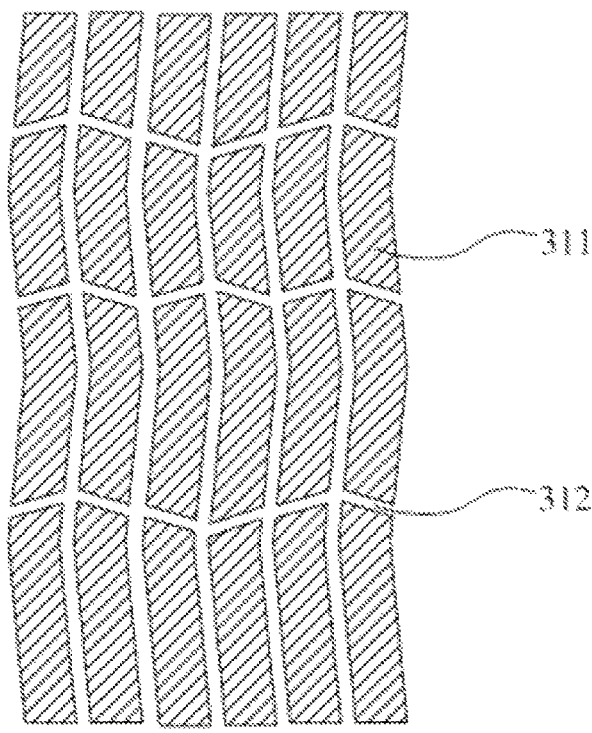
FIG. 14 illustrates a schematic diagram of a pattern of a dummy electrode according to an embodiment of the present invention.
Figure 15:
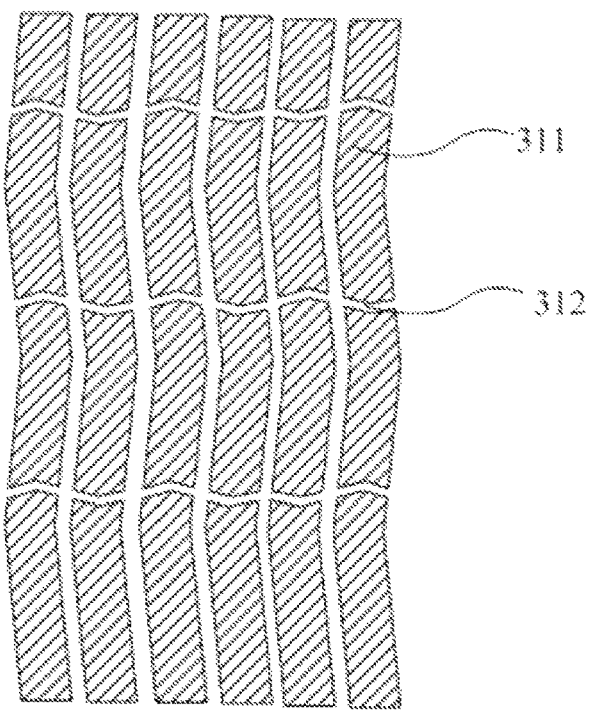
FIG. 15 illustrates a schematic diagram of a pattern of a dummy electrode according to an embodiment of the present invention.
Figure 16:
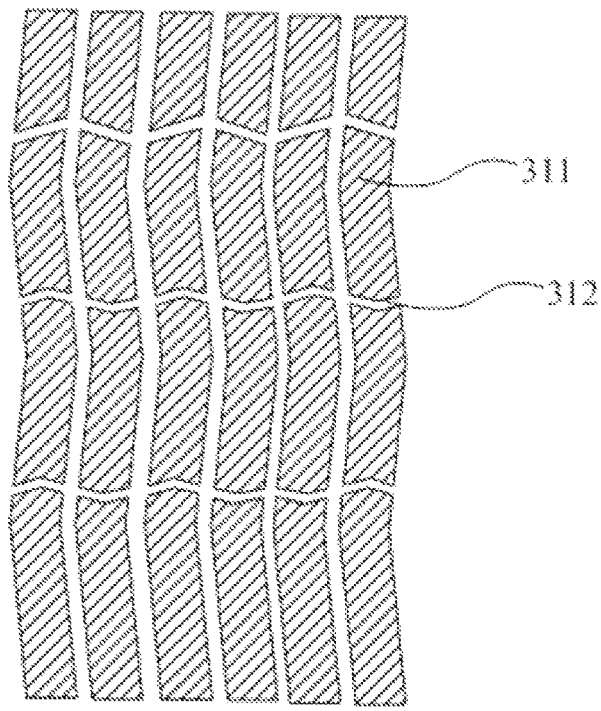
FIG. 16 illustrates a schematic diagram of a pattern of a dummy electrode according to an embodiment of the present invention.

FIG. 14, FIG. 15 and FIG. 16 illustrate schematic diagrams of a pattern of a dummy electrode according to embodiments of the present invention. The sub-slits in the same dummy electrode form a plurality of rows of sub-slits, which are spaced apart from one another in the first direction, and the sub-slits 312 in each of the rows of sub-slits are connected into a shape which is a folded line.

It shall be noted that the sub-slits in each of the rows of sub-slits can be connected into a shape other than a straight line, i.e., the sub-slits in the row of sub-slits can be connected into a shape other than a straight line parallel to the second direction, which will not be limited to the folded lines in FIG. 14, FIG. 15 and FIG. 16 but can alternatively be a waved line or a shape other than a straight line.

Figure 17:
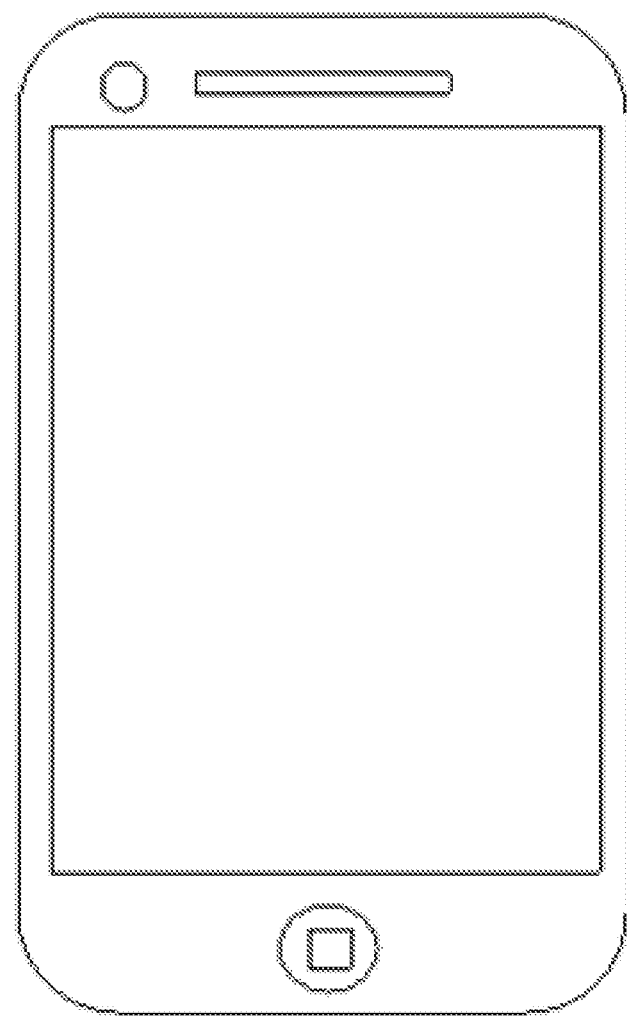
FIG. 17 illustrates a schematic structural diagram of an electronic apparatus according to an embodiment of the present invention.

An embodiment of the present invention further provides an electronic apparatus, as illustrated in FIG. 17, which includes the touch display device described above. The electronic apparatus can be a handset, a tablet PC, a notebook PC, a GPS device, etc.

Evidently those skilled in the art can make various modifications and variations to the present invention without departing from the spirit and scope of the present invention. Thus the present invention is also intended to encompass these modifications and variations thereto so long as the modifications and variations come into the scope of the claims appended to the present invention and their equivalents.

What is claimed is:

1. A touch display device comprising:
a display unit and a touch unit,
wherein the touch unit comprises a transparent electrode arranged opposite to the display unit, and a pattern of the transparent electrode comprises a plurality of first touch electrodes and a plurality of dummy electrodes; and each of the first touch electrodes extends in a first direction,
wherein each of the dummy electrodes comprises at least two columns of dummy sub-electrodes, each of the columns of dummy sub-electrodes comprises a plurality of dummy sub-electrodes arranged along the first direction with each extending in the first direction, a sub-slit is formed between every two adjacent dummy sub-electrodes in each of the columns of dummy sub-electrodes, and at least a portion of the sub-slits of at least two adjacent ones of the columns of dummy sub-electrodes are arranged staggeredly in the first direction,
wherein the two adjacent columns of dummy sub-electrodes are a first column of dummy sub-electrodes and a second column of dummy sub-electrodes, the sub-slits of the first column of dummy sub-electrodes are defined as first sub-slits, the sub-slits of the second column of dummy sub-electrodes are defined as second sub-slits, and the first sub-slits and the second sub-slits are shaped differently, or shaped identically but extend in different and non-parallel directions, and
wherein
each of the first touch electrodes comprises a plurality of parallel first sub-touch electrodes extending in the first direction and arranged in a second direction, having a plurality of third slits in parallel with the plurality of parallel first sub-touch electrodes and each third slit being between two adjacent parallel first sub-touch electrodes, each of the first touch electrodes is provided with an opening, wherein at least one of the plurality of dummy electrodes is arranged, with fourth slits formed between edges of the opening and ends of each of the columns of dummy sub-electrodes, and a length of the opening in the first direction is larger than a length of third slits arranged in a same column in the first direction,
the first sub-slits and the second sub-slits are folded lines, a folding direction of the first sub-slits being different from a folding direction of the second sub-slits, and
in addition to the plurality of parallel first sub-touch electrodes, a plurality of first electrodes are arranged across each third slit along the second direction and further connecting to adjacent parallel first sub-touch electrodes, and first electrodes in adjacent parallel third slits are arranged staggeredly along the first direction.

2. The touch display device according to claim 1, wherein the sub-slits of every two adjacent ones of the columns of dummy sub-electrodes in a same dummy electrode are arranged staggeredly in the first direction.

3. The touch display device according to claim 1, wherein the at least two columns of dummy sub-electrodes are divided into a plurality of groups, the columns of dummy sub-electrodes in a same group comprise n adjacent ones of the columns of dummy sub-electrodes, the sub-slits of the columns of dummy sub-electrodes in the same group form a plurality of rows of sub-slits spaced apart from one another in the first direction, and the sub-slits in each of the rows of sub-slits are connected, wherein n is 2 or 3; and
the sub-slits of the adjacent columns of dummy sub-electrodes in every two adjacent ones of the groups are arranged staggeredly in the first direction.

4. The touch display device according to claim 1, wherein the sub-slits are straight lines disposed at an angle of more than 0 degrees in relation to the second direction; or
the sub-slits are folded lines or waved lines, wherein the second direction intersects the first direction.

5. The touch display device according to claim 4, wherein there is a second slit formed between the two adjacent columns of dummy sub-electrodes and shaped as a folded line or a waved line.

6. The touch display device according to claim 5, wherein the dummy sub-electrodes are strip-shaped or v-shaped or wave-shaped.

7. The touch display device according to claim 6, wherein the plurality of first touch electrodes are spaced apart from one another in the second direction; and
one of the dummy electrodes is arranged between every two adjacent ones of the first touch electrodes.

8. The touch display device according to claim 7, wherein every two adjacent ones of the fourth slits in a same dummy electrode are arranged staggeredly in the first direction.

9. The touch display device according to claim 1, wherein the third slit is formed as a folded line or a waved line between two adjacent ones of the first sub-touch electrodes and extending in the first direction.

10. A touch display device, comprising:
a display unit and a touch unit,
wherein the touch unit comprises a transparent electrode arranged opposite to the display unit, and a pattern of the transparent electrode comprises a plurality of first touch electrodes and a plurality of dummy electrodes; and each of the first touch electrodes extends in a first direction,
wherein each of the dummy electrodes comprises a plurality of columns of dummy sub-electrodes, each of the columns of dummy sub-electrodes comprises a plurality of dummy sub-electrodes arranged along the first direction with each extending in the first direction, a sub-slit is formed between every two adjacent dummy sub-electrodes in each of the columns of dummy sub-electrodes, the sub-slits in a same dummy electrode form a plurality of rows of sub-slits spaced apart from one another in the first direction, and the sub-slits in each of the rows of sub-slits are connected into a shape other than a straight line, wherein the two adjacent columns of dummy sub-electrodes are a first column of dummy sub-electrodes and a second column of dummy sub-electrodes, the sub-slits of the first column of dummy sub-electrodes are defined as first sub-slits, the sub-slits of the second column of dummy sub-electrodes are defined as second sub-slits, and the first sub-slits and the second sub-slits are shaped differently, or shaped identically but extend in different and non-parallel directions, wherein each of the first touch electrodes comprises a plurality of parallel first sub-touch electrodes extending in the first direction and arranged in a second direction, having a plurality of third slits in parallel with the plurality of parallel first sub-touch electrodes and each third slit being between two adjacent parallel first sub-touch electrodes, in addition to the plurality of parallel first sub-touch electrodes, a plurality of first electrodes are arranged across each third slit along the second direction and further connecting to adjacent parallel first sub-touch electrodes, and first electrodes in adjacent parallel third slits are arranged staggeredly along the first direction, the first sub-slits and the second sub-slits are folded lines, a folding direction of the first sub-slits being different from a folding direction of the second sub-slits, and each of the first touch electrodes is provided with an opening, wherein at least one of the plurality of dummy electrodes is arranged, with fourth slits formed between edges of the opening and ends of each of the columns of dummy sub-electrodes, and a length of the opening in the first direction is larger than a length of third slits arranged in a same column in the first direction.

11. The touch display device according to claim 10, wherein the sub-slits in the row of sub-slits are connected into the shape of a folded line or a waved line.

12. The touch display device according to claim 10, wherein the sub-slits are straight lines disposed at an angle of more than 0 degree in relation to the second direction; or the sub-slits are folded lines or waved lines, wherein the second direction intersects the first direction.

13. The touch display device according to claim 12, wherein there is a second slit formed between every two adjacent ones of the columns of dummy sub-electrodes, the second slit being shaped as a folded line or a waved line.

14. The touch display device according to claim 13, wherein the dummy sub-electrodes are strip-shaped, v-shaped, or wave-shaped.

15. The touch display device according to claim 14, wherein the plurality of first touch electrodes are spaced apart from one another in the second direction; and
one of the dummy electrodes is arranged between every two adjacent ones of the first touch electrodes.

16. The touch display device according to claim 15, wherein every two adjacent ones of the fourth slits in a same dummy electrode are arranged staggeredly in the first direction.

17. The touch display device according to claim 10, wherein the third slit is formed as a folded line or a waved line between two adjacent ones of the first sub-touch electrodes and extending in the first direction.

18. An electronic apparatus, comprising the touch display device according to claim 1.

19. A touch display device, comprising:
a display unit and a touch unit,
wherein the touch unit comprises a transparent electrode arranged opposite to the display unit, and a pattern of the transparent electrode comprises a plurality of first touch electrodes and a plurality of dummy electrodes; and each of the first touch electrodes extends in a first direction, wherein each of the dummy electrodes comprises at least two columns of dummy sub-electrodes, each of the columns of dummy sub-electrodes comprises a plurality of dummy sub-electrodes arranged along the first direction with each extending in the first direction, a sub-slit is formed between every two adjacent dummy sub-electrodes in each of the columns of dummy sub-electrodes, and at least a portion of the sub-slits of at least two adjacent ones of the columns of dummy sub-electrodes are arranged staggeredly in the first direction, wherein the two adjacent columns of dummy sub-electrodes are a first column of dummy sub-electrodes and a second column of dummy sub-electrodes, the sub-slits of the first column of dummy sub-electrodes are defined as first sub-slits, the sub-slits of the second column of dummy sub-electrodes are defined as second sub-slits, and the first sub-slits and the second sub-slits are shaped differently, or shaped identically but extend in different and non-parallel directions, and wherein each of the first touch electrodes comprises a plurality of parallel first sub-touch electrodes extending in the first direction and arranged in a second direction, having a plurality of third slits in parallel with the plurality of parallel first sub-touch electrodes and each third slit being between two adjacent parallel first sub-touch electrodes, in addition to the plurality of parallel first sub-touch electrodes, a plurality of first electrodes are arranged across each third slit along the second direction and further connecting to adjacent parallel first sub-touch electrodes, and first electrodes in adjacent parallel third slits are arranged staggeredly along the first direction, the first sub-slits and the second sub-slits are folded lines, a folding direction of the first sub-slits being different from a folding direction of the second sub-slits, and each of the first touch electrodes is provided with an opening, wherein at least one of the plurality of dummy electrodes is arranged, with fourth slits formed between edges of the opening and ends of each of the columns of dummy sub-electrodes, and a length of the opening in the first direction is larger than a length of third slits arranged in a same column in the first direction.

20. The touch display device according to claim 1, wherein:
the plurality of first electrodes interrupts a corresponding third slit into a plurality of electrode-interrupted slit portions having a length in parallel with the plurality of parallel first sub-touch electrodes, and
electrode-interrupted slit portions in adjacent parallel third slits are arranged staggeredly along the first direction.

* * * * *